United States Patent
Owen (10) Patent No.: US 7,555,171 B2
(45) Date of Patent: Jun. 30, 2009

(54) SYSTEMS AND METHODS FOR DOWN SCALING A BITMAP

(75) Inventor: James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 829 days.

(21) Appl. No.: 10/800,528

(22) Filed: Mar. 15, 2004

(65) Prior Publication Data

US 2005/0201641 A1     Sep. 15, 2005

(51) Int. Cl.
- G06K 9/32    (2006.01)
- G09G 5/02    (2006.01)
- H04N 9/74    (2006.01)
- H04N 1/393   (2006.01)

(52) U.S. Cl. .................. 382/299; 345/698; 348/581; 358/451

(58) Field of Classification Search ............ None
See application file for complete search history.

(56) References Cited

U.S. PATENT DOCUMENTS

| | | | |
|---|---|---|---|
| 5,097,518 A * | 3/1992 | Scott et al. | 382/298 |
| 5,347,597 A | 9/1994 | Stephenson | |
| 5,351,305 A | 9/1994 | Wood et al. | |
| 5,754,698 A * | 5/1998 | Suzuki et al. | 382/232 |
| 5,838,838 A * | 11/1998 | Overton | 382/298 |
| 6,216,144 B1 * | 4/2001 | De Vogel | 715/203 |
| 6,453,074 B1 * | 9/2002 | Zheng | 382/260 |
| 6,668,102 B2 * | 12/2003 | Chiba et al. | 382/305 |
| 2002/0186765 A1 * | 12/2002 | Morley et al. | 375/240.2 |
| 2003/0227466 A1 | 12/2003 | Stamm et al. | |
| 2004/0076328 A1 * | 4/2004 | Li | 382/176 |

FOREIGN PATENT DOCUMENTS

| | | |
|---|---|---|
| EP | 5 10182 | 10/1996 |
| EP | 8 95187 | 2/1999 |
| JP | 1-0164483 | 6/1998 |
| WO | WO 94/13098 | 6/1994 |

OTHER PUBLICATIONS

Tsang, et al., "Encoding of colour images using adaptive decimation and interpolation," IEEE Proc. Vis. Image Signal Process., vol. 146, No. 1, Feb. 1999.*

"Image Scaling with Bresenham", by Thiadmer Riemersma, Dr. Dobb's Journal, May 2002.

* cited by examiner

*Primary Examiner*—Charles Kim
(74) *Attorney, Agent, or Firm*—Austin Rapp & Hardman

(57) ABSTRACT

A method for scaling a first bitmap from a first size to a second size is disclosed. A first bitmap is accessed. The first bitmap is iterated through and the following are performed until no more size reductions are needed to scale the first bitmap to the second size. A group of pixels is identified from the first bitmap. A unique pixel is identified in the group of pixels. One or more pixels including the unique pixel are copied from the group of pixels to a second bitmap, wherein one or more pixels are not copied to the second bitmap and are not the unique pixel.

25 Claims, 7 Drawing Sheets

SYSTEMS AND METHODS FOR DOWN SCALING A BITMAP

TECHNICAL FIELD

The present invention relates generally to bitmaps and images. More specifically, the present invention relates to systems and methods for down scaling a bitmap.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Digital images are often described as bitmaps formed of individual pixels. Digital images may result from either real world capture or computer generation. A scanner and/or a digital camera may be used to capture digital images. Computer generation can be performed with the use of a paint program, screen capture, the conversion of a graphic into a bitmap image, etc.

In the simplest type of digital image, each pixel has only one of two values: black or white. For such a digital image, pixel encoding requires only one bit. If shades of gray are present within a digital image, two values are no longer sufficient for pixel encoding. Instead, each pixel is typically assigned a numerical value which is proportional to the brightness of that point. Such a digital image is often referred to as a grayscale image.

The encoding of color digital images takes advantage of the fact that any color can be expressed as a combination of three primary colors, such as red, green, and blue (RGB) or yellow, magenta, and cyan (YMC). Therefore, a color digital image can be thought of as the superposition of three color component planes. Within each plane, the brightness of a primary color is encoded. Some digital images, such as multi-spectral images, may have more than three planes of information.

Often with images it is desirable to reduce the size of an image. For example, a user may wish to reduce an image by 50%. Sometimes computer programs may need to reduce or scale down the size of an image internal to a computer program. In view of the foregoing, benefits may be realized by improvements relating to the way that images or bitmaps are scaled down or reduced in size.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

A common method for scaling a first bitmap from a first size to a second size comprises iterating through the first bitmap forming groups of pixels to be copied to a second bitmap. The first bitmap is iterated through and the following are performed until no more size reductions are needed to scale the first bitmap to the second size. A first bitmap is accessed. A group of pixels is identified from the first bitmap. Some of the groups can be copied in their entirety, and are not necessarily processed by the embodiments herein. Others need to be reduced to a smaller group of pixels, and are referred here as the group of pixels.

A method for reducing the group of pixels is disclosed. A unique pixel or pixels is identified in the group of pixels. One or more pixels including the unique pixel or the unique pixels are copied from the group of pixels to a second bitmap, wherein one or more pixels are not copied to the second bitmap and are not the unique pixel.

In certain embodiments, each pixel in the group of pixels may be compared to a comparison set in order to identify the unique pixel or pixels. The comparison set may be adjacent to the group of pixels. The comparison set may comprise one pixel. In addition, the group of pixels may include the comparison set. Alternatively, the comparison set may not be in the group of pixels.

The unique pixel or pixels may include the most unique pixel or pixels. In some embodiments the first bitmap and the second bitmap may be different bitmaps. In other embodiments the first bitmap and the second bitmap may use the same bitmap for in-place scaling. The second bitmap may include copies of pixels from the first bitmap that have not been altered or transformed.

A computing device configured for scaling a first bitmap from a first size to a second size is also disclosed. The computing device includes a processor and memory in electronic communication with the processor. Executable instructions executable by the processor are also included that are configured to implement a method for scaling a first bitmap from a first size to a second size as disclosed herein.

A computer-readable medium for storing program data is also disclosed. The program data includes executable instructions for implementing a method for scaling a first bitmap from a first size to a second size as disclosed herein.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

When an image is scaled down, thin lines (lines of 1-2 pixels) are often dropped from the image. In some cases it is appropriate to drop those pixels while in other cases it causes what the end user interprets as a defect in the scaled down image. To avoid this line dropping, current state of the art uses a variety of algorithms that may produce improved results but are computationally intensive and degrade performance.

One way to shrink an image is to copy some of the pixels from some of the scan lines while leaving some pixels out of the new image. This sort of scaling is usually called decimation or uniform point sampling.

Sometimes decimation algorithms cause distortion in the image. The distortion is sometimes referred to as an artifact. The artifacts, such as "jaggies", produced by decimation algorithms are usually ameliorated by using filtering algorithms that produce new pixel values. Filtering algorithms typically consist of weighted sums of pixel values in the neighborhood around each point to be sampled.

Figure 1:
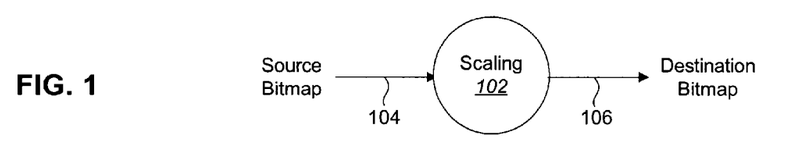
FIG. 1 is a block diagram illustrating a scaling algorithm.

Referring now to FIG. 1, a scaling algorithm 102 is disclosed. The disclosed algorithm 102 implements intelligent decimation in that it compares one or more pixels and keeps the most unique pixel or pixels. It does not identify a "sample point" as in some filtering algorithms that are in use. As will be explained more fully below, the algorithm 102 identifies a range of pixels to be decimated and kills all but the most unique (e.g., as compared to a neighborhood around the range). The scaling algorithm 102 takes as input a source image 104 or source bitmap 104 and scales the image down to a smaller size to produce a destination bitmap 106 or scaled image 106. In one embodiment, the scaling algorithm 102 may be viewed as an algorithm 102 that copies some, but not all, of the pixels from the source bitmap 104 to the destination bitmap 106 to effectively scale down the image. The destination bitmap 106 is the scaled down image. The source bitmap 104 and the destination bitmap 106 may be different bitmaps, or they may be the same bitmap for in-place scaling.

The source bitmap 104 and the destination bitmap 106 may be in a variety of formats. Many different graphics file formats exist and may be used with the present system including, but not limited to, JPEG, GIF, BMP, TIFF, PNG, etc. In addition, the algorithm 102 may operate on an image simply stored in memory temporarily as it is being operated on in a larger process or system.

As referred to above, filtering algorithms are used to ameliorate jaggies produced by decimation algorithms. Filtering algorithms don't drop pixels but combine multiple source pixels into less destination pixels which may blur or lighten the image.

Figure 2:
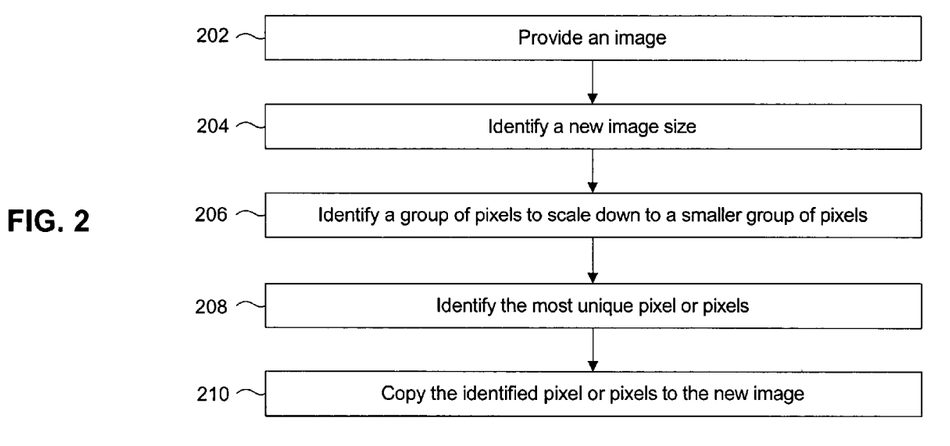
FIG. 2 is a flow diagram of a method for scaling an image or bitmap by identifying the most unique pixel in a group of pixels within the bitmap.

FIG. 2 is a flow diagram of a method for scaling an image using comparison to determine which pixel(s) should be copied to the destination. An image is provided 202. This image has an original size. Then a new image size is identified 204. The new image size is smaller than the original size. A group of pixels is identified 206 to scale down to a smaller group of pixels. The group of pixels may have two or more pixels. Then the most unique pixel (or pixels) is identified 208. One or more pixels, including the identified most unique or more unique pixels, are copied 210 to the new image (e.g., the destination bitmap or image). The pixel or pixels that are not copied to the destination are not the most unique but are more common and are then removed from the group to effectively scale the group of pixels down from a larger size to a smaller size. The source and destination bitmaps could be the same bitmap or image, as when in-place scaling is performed, or they may be separate bitmaps or images.

The disclosed algorithm 102 implements intelligent decimation. It does not identify a sample point as in some filtering algorithms that are in use. In one implementation the algorithm identifies a range of pixels to be decimated and kills all but the most unique (as compared to neighborhood around the range). In this particular implementation the algorithm (1) finds the pixels to be combined into fewer destination pixels, and (2) copies one or more of the more unique pixels by ignoring pixels except the more unique using the fact that one or more of the pixels can be categorized as more unique according to criteria set or determined by those implementing the particular system. One may look at neighborhood pixels in addition to the pixels to be combined.

There are several algorithms for determining which source pixels need to be combined into one destination pixel. For example, nearest neighbor resampling algorithms, fast Bresenham based scaling algorithms, etc., can be used to determine which source pixels need to be combined into one destination pixel. There are also several algorithms for combining pixels. For example one way is to simply copy the first pixel. Another way to combine pixels is to compute a weighted average of the pixels. The disclosed algorithm is a new and novel way of combining pixels.

Figure 3:
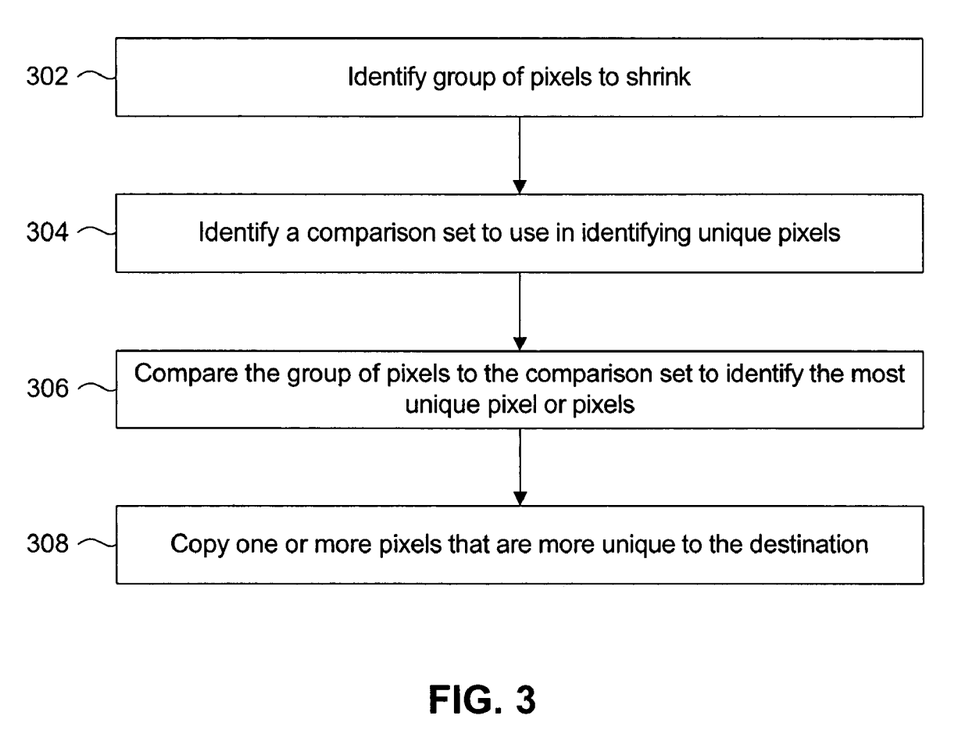
FIG. 3 is a flow diagram of another method for scaling an image or bitmap by identifying the most unique pixel in a group of pixels within the bitmap.

FIG. 3 is a flow diagram of another method for scaling an image using comparison to kill one or more pixels. A group of pixels is identified 302 to shrink. The group of pixels may have two or more pixels. A comparison set is identified 304 to use in identifying unique pixels. The comparison set may be within the group of pixels or it may be outside of the group of pixels. In addition, the comparison set may be preconfigured and within the algorithm itself and not from the image. Then the group of pixels is compared 306 to the comparison set to identify the most unique pixel or pixels. One or more pixels that are the more unique pixels are copied 308 to the destination, or in other words they are removed from the group, to effectively scale the group of pixels down from a larger size to a smaller size.

Figure 4:
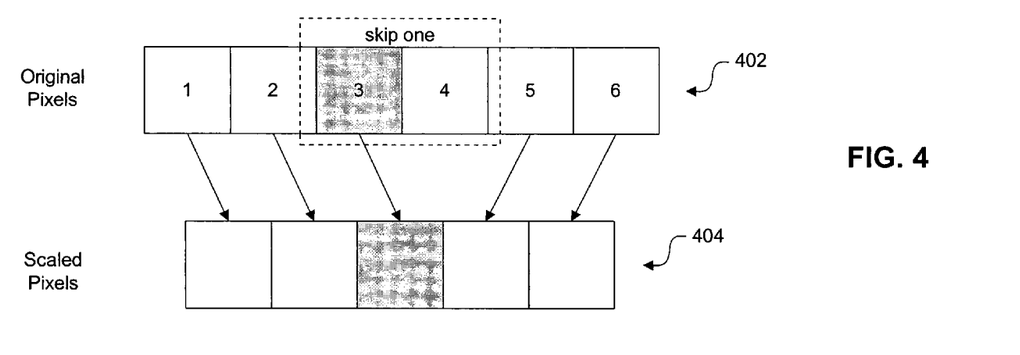
FIG. 4 is a diagram illustrating a down scaling method.
Figure 5:
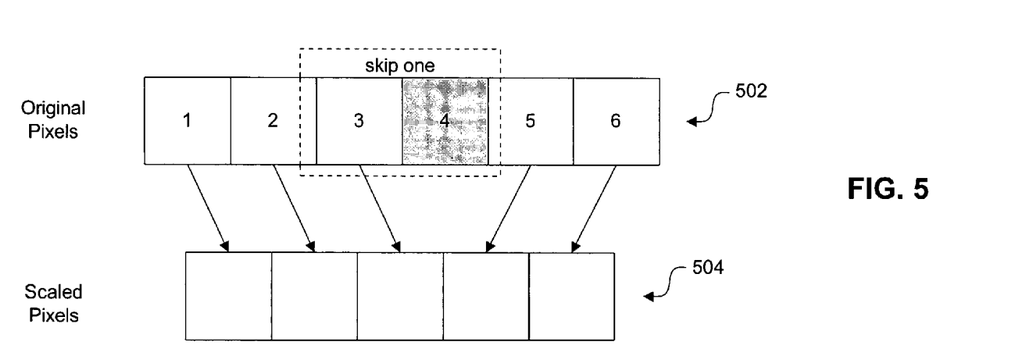
FIG. 5 is another diagram illustrating a down scaling method.

The scaling algorithm 102 being disclosed is a simple but novel way of combining pixels. In the embodiment shown in FIGS. 6 and 7, the algorithm 102 looks at one or more of the previous pixels outside of the chosen range and picks the most distinct pixel in the range. Referring now to FIGS. 4 and 5, these diagrams show the current state of the art algorithms when downscaling between 50% and 100%. In this range, one will need to remove at most one pixel at a time.

FIG. 4 shows a row 402 of pixels being downscaled. The six pixels in the original bitmap are being scaled into 5 pixels in the destination bitmap 404. The diagram shows that when removing a pixel, the algorithm followed in FIG. 4 picks the first pixel as the pixel to copy to the destination bitmap 404. As shown, pixels 3 and 4 are to be combined into one pixel. The first one of the two, pixel 3, is copied to the scaled pixels 404 and pixel 4 is dropped. The algorithms illustrated with FIGS. 4 and 5 do not perform a comparison step or determine the most unique pixel. FIG. 5 shows the algorithm of FIG. 4 with a different set of original pixels. Although pixel 4 is the most unique, because the algorithm simply takes the first pixel and copies it to the scaled pixels, the most unique pixel is not retained in the scaled pixels.

Figure 6:
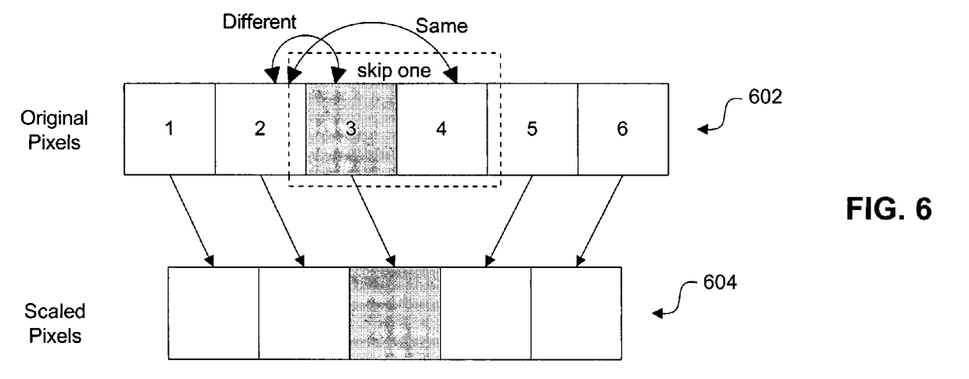
FIG. 6 is a diagram illustrating a down scaling method according to the present embodiments.
Figure 7:
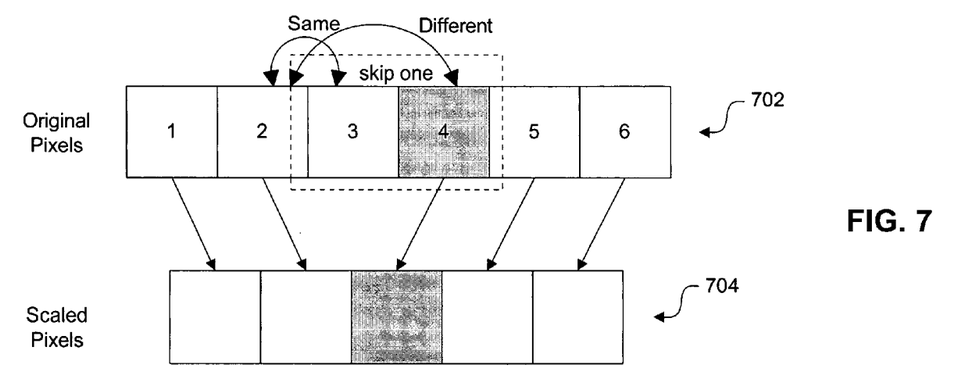
FIG. 7 is another diagram illustrating a down scaling method according to the present embodiments.

FIGS. 6 and 7 illustrate the use of an implementation of the disclosed algorithm 102. One of the reasons why the present algorithm is unique is because it merges the faster decimation approach (instead of computing a value for the pixels) with the consideration of surrounding pixels (used by filter algorithms). Fast and simple scaling algorithms typically use decimation to achieve speed at the expense of quality. The higher order filter scaling algorithms use computations involving adjacent pixels to create new pixel values. The algorithm illustrated in FIGS. 7 and 8 uses intelligent decimation by considering adjacent pixels and achieves its speed by using only comparisons and copying pixels.

FIG. 6 is a diagram showing six pixels in the original bitmap 602 being scaled into 5 pixels in the destination bitmap 604. The group of original pixels 602 are scaled down to the scaled pixels 604 shown. In the example of FIG. 6, pixel 3 is compared to the previous pixel, pixel 2, and is determined to be different from pixel 2. It is also different than the rest of the pixels. Therefore, it is determined to be the most unique. As a result, pixel 3 is kept and copied to the scaled pixels 604.

FIG. 7 is similar to FIG. 6 except that it is pixel 4 that is the most unique. The algorithm determines that pixel 3 is in fact the same as pixel 2. As a result, pixel 3 of FIG. 7 is not the most unique. Pixel 4 is compared to pixel 2 and is different. It is more unique than the other pixels and is therefore kept in the scaled pixels 704.

The examples of FIGS. 4-7 are meant to be exemplary only and are not limiting. The groups of pixels that are shrunk down or scaled down can be in a variety of configurations including, but not limited to, adjacent pixels, a row of pixels, a column of pixels, a two-dimensional group of pixels, etc.

Figure 8:
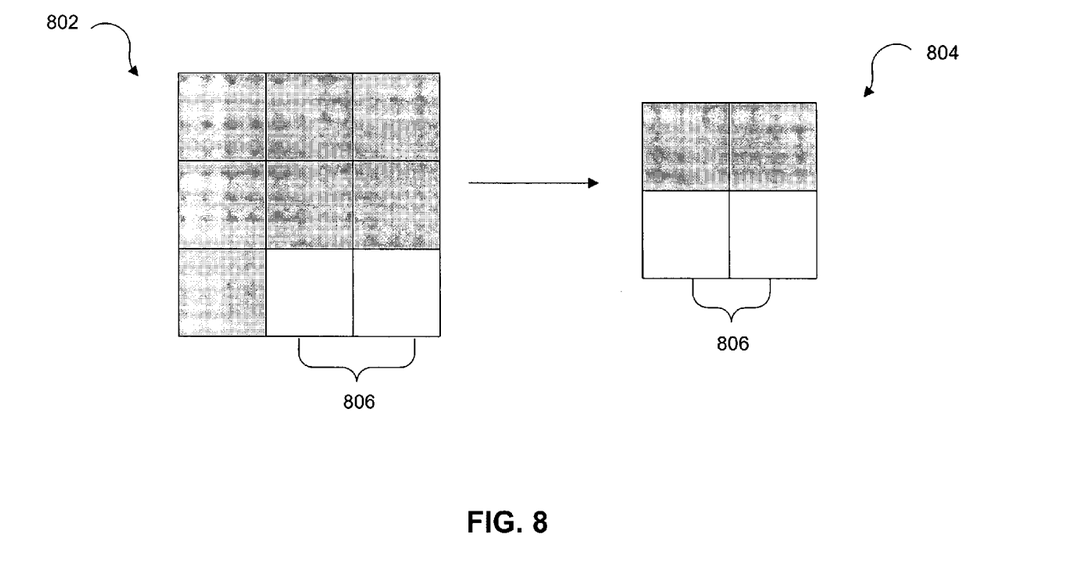
FIG. 8 is a further diagram illustrating a down scaling method according to the present embodiments.

FIG. 8 is a diagram of a group 802 of 9 pixels being scaled down into a group 804 of 4 pixels. In the embodiment of FIG. 8 the pixels are compared against each other to determine the most unique pixels. The most unique pixels 806 are identified and are kept in the reduced size image 804. The other more common pixels are removed from the scaled down image 804.

There are a variety of ways to group pixels together before the group of pixels is reduced in size by removing one or more pixels. One way to group pixels together is to group them in linear groups (e.g., by row or by column) and to simply start with the first pixel in the linear group and iterate toward the end of the linear group. For example, assume that there is an image of 1,000 pixels by 1,000 pixels to be reduced to an image of 800×800. The algorithm could simply start with the first row and group together the first 5 pixels. From this first group of pixels the algorithm could eliminate one pixel using the methods described herein. Then the next group of 5 pixels could be grouped, and so forth. Once the first row was completed, the algorithm could then continue with the second row. When all rows were completed the image would have been reduced in only one dimension. Then the columns could be done in similar fashion such that the new reduced image of 800×800 is produced.

There are other ways to determine the groups of pixels, for example the techniques disclosed in an article entitled "Image Scaling with Bresenham", Dr. Dobb's Journal, May 2002, may also be used. The article entitled "Image Scaling with Bresenham", Dr. Dobb's Journal, May 2002, is hereby incorporated by reference.

There are a variety of ways to determine the most unique pixel or pixels. If the image is simply a monochrome bitmap, the most unique pixel would be the least common pixel in the group, or the least common pixel when compared to a comparison pixel or set of pixels. The examples in FIGS. 4-8 illustrate this situation. For greyscale, color or other kinds of images, there are other ways to determine the most unique pixel or pixels. For Grayscale images, the uniqueness of a pixel is proportional to the difference of its value and the average value of a group of surrounding pixels. Another measure could include multiple groups of pixels weighted differently depending on their distance from the pixel in question. For color pixels, the uniqueness of a pixel could compare it's luminance with that of the average of surrounding pixels. Another measure could be the sum of the differences in each color (R, G, and B) for example. These various examples of measures of uniqueness are only meant to illustrate exemplary techniques and are not meant to limit the inventive concepts herein. Of course, other measures of uniqueness may also be used without detracting from the scope of the present invention.

Figure 9:
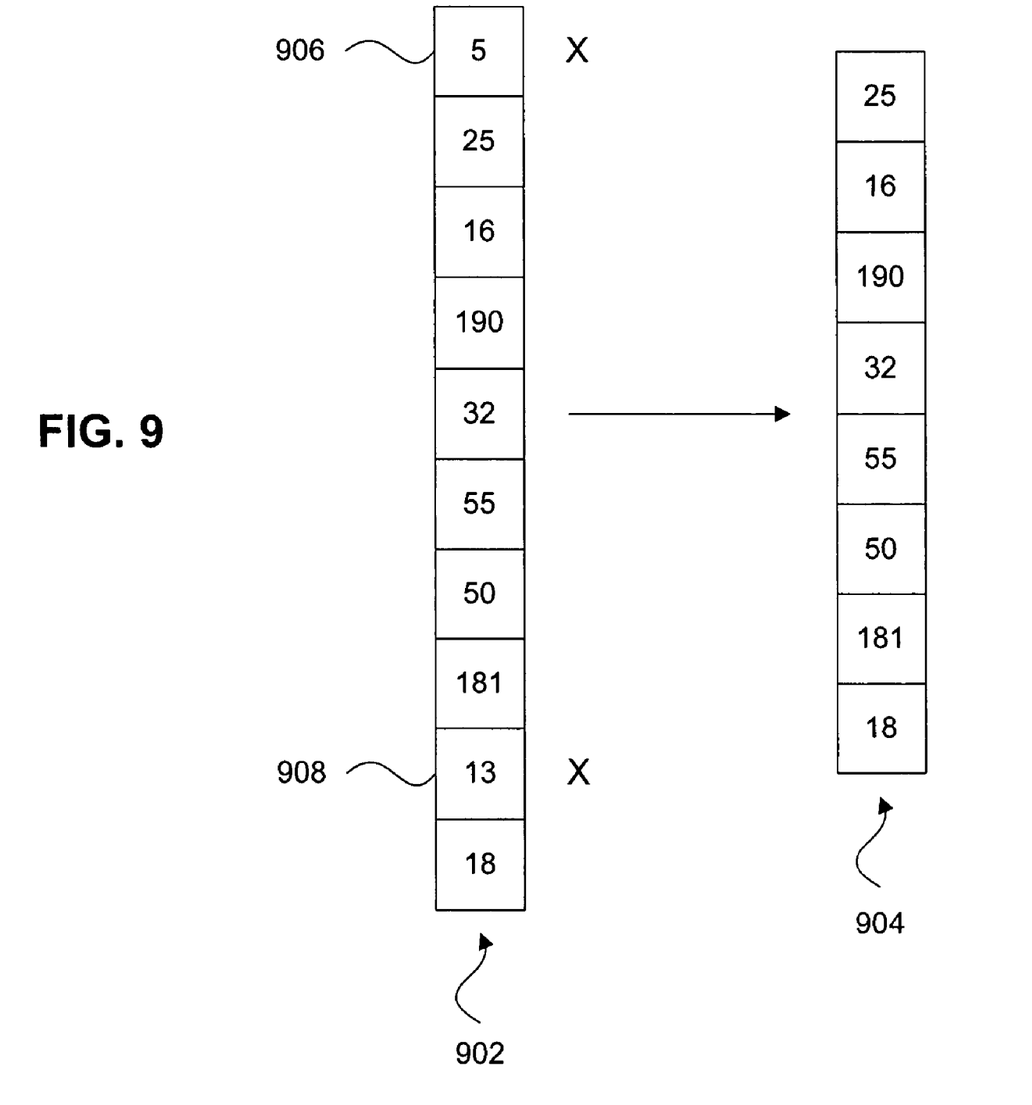
FIG. 9 is another diagram illustrating a down scaling method according to the present embodiments.

FIG. 9 illustrates an additional example of how to determine the most unique pixel or pixels. In FIG. 9 an original group 902 of 10 pixels is to be reduced to a group 904 of 8 pixels. The embodiment of FIG. 9 uses a method whereby each pixel is given a numerical value. These numerical values can be based on the color through use of a look-up table determined beforehand that equates the most unique pixel values to the highest number and the least unique pixel values with the lowest numbers. When the comparison is done to determine the most unique pixels, the most unique pixels have the higher values, while the lowest values are the least unique. As a result, the least unique pixels 906, 908 are not copied into the reduced size image 904.

Figure 10:
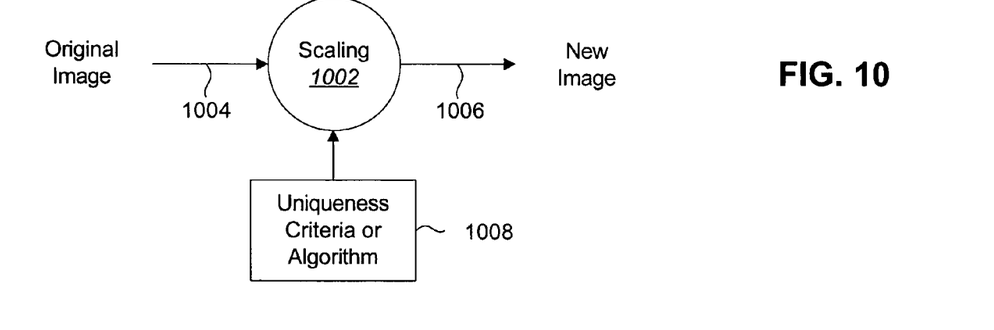
FIG. 10 is a block diagram illustrating the scaling algorithm using uniqueness criteria or a uniqueness algorithm.

FIG. 10 is a block diagram illustrating the scaling algorithm using uniqueness criteria or a uniqueness algorithm 1008. The scaling algorithm 1002 takes an original image 1004 and uses the methods described herein to produce a new image 1006 that is reduced in size or scaled down. The algorithm 1002 may use uniqueness criteria 1008 or a uniqueness algorithm 1008 to determine the most unique pixels in its processing. The uniqueness criteria may include look-up tables or cut-off values to determine the uniqueness of a pixel relative to another pixel or simply the uniqueness of the pixel individually. An algorithm may implement a process for determining uniqueness as well. Different methods and techniques are described above.

Figure 11:
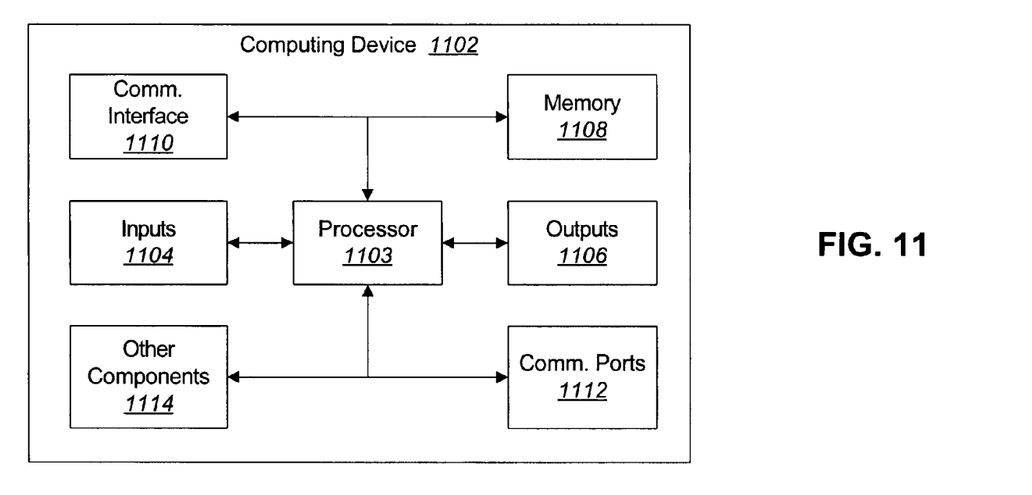
FIG. 11 is a block diagram illustrating the major hardware components typically utilized with embodiments herein.

FIG. 11 is a block diagram illustrating the major hardware components typically utilized with embodiments herein. The systems and methods disclosed may be used with a computing device 1102. Computing devices 1102 are known in the art and are commercially available. The major hardware components typically utilized in a computing device 1102 are illustrated in FIG. 11. A computing device 1102 typically includes a processor 1103 in electronic communication with input components or devices 1104 and/or output components or devices 1106. The processor 1103 is operably connected to input 1104 and/or output devices 1106 capable of electronic communication with the processor 1103, or, in other words, to devices capable of input and/or output in the form of an electrical signal. Embodiments of devices 1102 may include the inputs 1104, outputs 1106 and the processor 1103 within the same physical structure or in separate housings or structures.

The electronic device 1102 may also include memory 1108. The memory 1108 may be a separate component from the processor 1103, or it may be on-board memory 1108 included in the same part as the processor 1103. For example, microcontrollers often include a certain amount of on-board memory.

The processor 1103 is also in electronic communication with a communication interface 1110. The communication interface 1110 may be used for communications with other devices 1102, imaging devices 1120, servers, etc. Thus, the communication interfaces 1110 of the various devices 1102 may be designed to communicate with each other to send signals or messages between the computing devices 1102.

The computing device 1102 may also include other communication ports 1112. In addition, other components 1114 may also be included in the electronic device 1102.

Many kinds of different devices may be used with embodiments herein. The computing device 1102 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 11 is only meant to illustrate typical components of a computing device 1102 and is not meant to limit the scope of embodiments disclosed herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for scaling a first bitmap from a first size to a second size by a computing device, the method comprising:

accessing a first bitmap by the computing device;

using the computing device to iterate through the first bitmap and perform the following until no more size reductions are needed to scale the first bitmap to the second size:

identifying a group of pixels from the first bitmap;

assigning a numerical value to each pixel in the group of pixels, wherein higher numerical values are assigned to more unique pixels and lower numerical values are assigned to less unique pixels;

identifying a unique pixel or unique pixels in the group of pixels, wherein the unique pixel or pixels comprises the pixel or pixels with the highest assigned numerical values; and copying one or more pixels including the unique pixel or the unique pixels from the group of pixels to a second bitmap, wherein the one or more pixels copied from the group of pixels to the second bitmap are not altered or transformed such that a new pixel value is not created, and wherein one or more pixels are not copied to the second bitmap and are not the unique pixel or pixels.

2. The method of claim 1, further comprising comparing each pixel in the group of pixels to a comparison set in order to identify the unique pixel or pixels.

3. The method of claim 2, wherein the comparison set is not in the group of pixels.

4. The method of claim 2, wherein the group of pixels comprises the comparison set.

5. The method of claim 2, wherein the comparison set is adjacent to the group of pixels.

6. The method of claim 5, wherein the comparison set comprises one pixel.

7. The method of claim 5, wherein the first bitmap and the second bitmap are using the same bitmap for in-place scaling.

8. The method of claim 1, wherein the first bitmap and the second bitmap are different bitmaps, and wherein the second bitmap comprises copies of pixels from the first bitmap that have not been altered or transformed.

9. A computing device configured for scaling a first bitmap from a first size to a second size, the computing device comprising:

a processor;

memory in electronic communication with the processor; and executable instructions executable by the processor, wherein the executable instructions are executable for:
accessing a first bitmap stored in the memory;
iterating through the first bitmap and performing the following until no more size reductions are needed to scale the first bitmap to the second size:
identifying a group of pixels from the first bitmap;
assigning a numerical value to each pixel in the group of pixels, wherein higher numerical values are assigned to more unique pixels and lower numerical values are assigned to less unique pixels;
identifying a unique pixel or unique pixels in the group of pixels, wherein the unique pixel or pixels comprises the pixel or pixels with the highest assigned numerical values; and
copying one or more pixels including the unique pixel or the unique pixels from the group of pixels to a second bitmap, wherein the one or more pixels copied from the group of pixels to the second bitmap are not altered or transformed such that a new pixel value is not created, and wherein one or more pixels are not copied to the second bitmap and are not the unique pixel or pixels.

10. The computing device of claim 9, wherein the executable instructions are further executable for comparing each pixel in the group of pixels to a comparison set in order to identify the unique pixel or pixels.

11. The computing device of claim 10, wherein the first bitmap and the second bitmap are different bitmaps, and wherein the second bitmap comprises copies of pixels from the first bitmap that have not been altered or transformed.

12. The computing device of claim 11, wherein the executable instructions are further executable for saving the second bitmap.

13. A computer-readable medium for storing program data, wherein the program data comprises executable instructions for:
accessing a first bitmap;
iterating through the first bitmap and performing the following until no more size reductions are needed to scale the first bitmap to the second size:
identifying a group of pixels from the first bitmap;
assigning a numerical value to each pixel in the group of pixels, wherein higher numerical values are assigned to more unique pixels and lower numerical values are assigned to less unique pixels;
identifying a unique pixel or unique pixels in the group of pixels, wherein the unique pixel or pixels comprises the pixel or pixels with the highest assigned numerical values; and
copying one or more pixels including the unique pixel or the unique pixels from the group of pixels to a second bitmap, wherein the one or more pixels copied from the group of pixels to the second bitmap are not altered or transformed such that a new pixel value is not created, and wherein one or more pixels are not copied to the second bitmap and are not the unique pixel or pixels.

14. The computer-readable medium of claim 13, wherein the executable instructions are further executable for comparing each pixel in the group of pixels to a comparison set in order to identify the unique pixel or pixels.

15. The computer-readable medium of claim 14, wherein the comparison set is not in the group of pixels.

16. The computer-readable medium of claim 14, wherein the group of pixels comprises the comparison set.

17. The computer-readable medium of claim 14, wherein the first bitmap and the second bitmap are different bitmaps, and wherein the second bitmap comprises copies of pixels from the first bitmap that have not been altered or transformed.

18. The computer-readable medium of claim 17, wherein the comparison set is adjacent to the group of pixels.

19. The computer-readable medium of claim 18, wherein the comparison set comprises one pixel.

20. The computer-readable medium of claim 18, wherein the comparison set comprises a plurality of pixels.

21. The computer-readable medium of claim 14, wherein the first bitmap and the second bitmap are different bitmaps.

22. The computer-readable medium of claim 14, wherein the first bitmap and the second bitmap are the same bitmap for in-place scaling.

23. The computer-readable medium of claim 13, wherein the first bitmap is a grayscale bitmap and the numerical value assigned to each pixel is proportional to a difference of a pixel value for the pixel and an average pixel value of a group of surrounding pixels.

24. The computer-readable medium of claim 13, wherein the first bitmap is a color bitmap and the numerical value assigned to each pixel is based on a comparison between a luminance of the pixel with an average luminance of a group of surrounding pixels.

25. The computer-readable medium of claim 13, wherein the first bitmap is a color bitmap and the numerical value assigned to each pixel is based on a comparison between a sum of color components of the pixel and at least one sum of color components of at least one surrounding pixel.

* * * * *